(12) United States Patent
Jung et al.

(10) Patent No.: US 10,212,637 B2
(45) Date of Patent: Feb. 19, 2019

(54) METHOD FOR REPORTING MOBILITY INFORMATION IN WIRELESS COMMUNICATION SYSTEM AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 15/067,603

(22) Filed: Mar. 11, 2016

(65) Prior Publication Data

US 2016/0198384 A1  Jul. 7, 2016

Related U.S. Application Data

(63) Continuation of application No. 14/414,694, filed as application No. PCT/KR2013/007094 on Aug. 6, 2013, now Pat. No. 9,344,937.

(Continued)

(51) Int. Cl.
*H04W 36/24* (2009.01)
*H04W 8/08* (2009.01)
(Continued)

(52) U.S. Cl.
CPC ........ *H04W 36/245* (2013.01); *H04B 7/0413* (2013.01); *H04J 11/00* (2013.01);
(Continued)

(58) Field of Classification Search
None
See application file for complete search history.

(56) References Cited

U.S. PATENT DOCUMENTS

2008/0043672 A1  2/2008  Sebire et al.
2010/0272050 A1*  10/2010  Lim ........................ H04W 8/22
                                                         370/329

(Continued)

FOREIGN PATENT DOCUMENTS

CN  101507331  8/2009
CN  101562851  10/2009

(Continued)

OTHER PUBLICATIONS

Japan Patent Office Application Serial No. 2015-526464, Office Action dated Dec. 14, 2015, 3 pages.

(Continued)

*Primary Examiner* — Andrew C Oh
(74) *Attorney, Agent, or Firm* — Lee Hong Degerman Kang Waimey

(57) ABSTRACT

Provided is a method for reporting mobility information by means of a terminal in a wireless communication system. The method includes generating mobility information and reporting the mobility information via a network. The mobility information includes mobility state information indicating the estimated mobility state of the terminal, and mobility history information relating to the mobility history of the terminal.

18 Claims, 13 Drawing Sheets

Related U.S. Application Data

(60) Provisional application No. 61/679,797, filed on Aug. 6, 2012.

(51) Int. Cl.

| | | |
|---|---|---|
| *H04W 24/10* | (2009.01) | |
| *H04W 36/00* | (2009.01) | |
| *H04W 36/08* | (2009.01) | |
| *H04W 36/32* | (2009.01) | |
| *H04B 7/0413* | (2017.01) | |
| *H04J 11/00* | (2006.01) | |
| *H04W 36/04* | (2009.01) | |
| *H04W 36/18* | (2009.01) | |
| *H04W 36/30* | (2009.01) | |
| *H04W 76/27* | (2018.01) | |
| *H04W 88/02* | (2009.01) | |

(52) U.S. Cl.
CPC ............ *H04W 8/08* (2013.01); *H04W 24/10* (2013.01); *H04W 36/0022* (2013.01); *H04W 36/04* (2013.01); *H04W 36/08* (2013.01); *H04W 36/18* (2013.01); *H04W 36/30* (2013.01); *H04W 36/32* (2013.01); *H04W 76/27* (2018.02); *H04W 88/02* (2013.01)

(56) References Cited

U.S. PATENT DOCUMENTS

| | | | | |
|---|---|---|---|---|
| 2011/0124330 A1* | 5/2011 | Kojima | ................. | H04W 36/32 455/424 |
| 2011/0149913 A1 | 6/2011 | Park et al. | | |
| 2012/0142355 A1* | 6/2012 | Jha | ................... | H04W 36/0061 455/436 |
| 2012/0258719 A1 | 10/2012 | Fujito et al. | | |
| 2012/0327797 A1* | 12/2012 | Siomina | ................ | H04W 36/30 370/252 |
| 2013/0122922 A1* | 5/2013 | Cho | ................ | H04W 8/08 455/450 |
| 2013/0165120 A1* | 6/2013 | Nylander | ................ | H04W 8/08 455/436 |
| 2013/0225169 A1* | 8/2013 | Farnsworth | ........... | H04W 60/04 455/436 |
| 2013/0260810 A1* | 10/2013 | Rayavarapu | .......... | H04W 76/19 455/509 |
| 2013/0322409 A1* | 12/2013 | Takahashi | ......... | H04W 36/0055 370/331 |
| 2014/0148174 A1* | 5/2014 | Teyeb | ............... | H04W 36/0083 455/441 |
| 2014/0357273 A1* | 12/2014 | Teng | .................... | H04W 36/32 455/436 |
| 2015/0111581 A1* | 4/2015 | Yiu | ........................ | H04W 4/22 455/437 |
| 2015/0119044 A1* | 4/2015 | Hwang | ................... | H04W 8/08 455/437 |
| 2015/0148042 A1* | 5/2015 | Hansson | ........... | H04W 36/0088 455/436 |
| 2015/0208264 A1* | 7/2015 | Koskinen | .............. | H04W 24/10 455/67.11 |
| 2015/0215830 A1* | 7/2015 | Dalsgaard | ......... | H04W 36/0094 455/444 |
| 2016/0345160 A1* | 11/2016 | Diachina | ................ | H04W 8/00 |

FOREIGN PATENT DOCUMENTS

| | | |
|---|---|---|
| CN | 102594895 | 7/2012 |
| EP | 1902592 | 3/2008 |
| EP | 2426980 | 3/2012 |
| JP | 2007-274152 | 10/2007 |
| JP | 2007274152 | 10/2007 |
| JP | 2010501132 | 1/2010 |
| JP | 2011135382 A | 7/2011 |
| JP | 2013502748 A | 1/2013 |
| KR | 20100063789 | 6/2010 |
| KR | 10-2010-0118532 | 11/2010 |
| RU | 2366109 | 8/2009 |
| WO | 2007/004956 | 1/2007 |
| WO | 2007004956 | 1/2007 |
| WO | 2008020280 | 2/2008 |
| WO | 2008112819 | 9/2008 |
| WO | 2009062302 | 5/2009 |
| WO | 2011/021592 | 2/2011 |
| WO | 2011021592 | 2/2011 |
| WO | 2011083801 | 7/2011 |
| WO | 2012/008887 | 1/2012 |
| WO | 2012008887 | 1/2012 |
| WO | 2012/031620 | 3/2012 |
| WO | 2012096403 | 7/2012 |

OTHER PUBLICATIONS

European Patent Office Application Serial No. 13827151.5, Search Report dated Mar. 2, 2016, 9 pages.
Nokia Corporation, et al., "UE assistance for mobility", R2-122516, 3GPP TSG-RAN WG2 Meeting #78, May 2012, 4 pages.
PCT International Application No. PCT/KR2013/007094, Written Opinion of the International Searching Authority dated Nov. 27, 2013, 1 page.
Japan Patent Office Application Serial No. 2015-526464, Office Action dated Apr. 6, 2016, 4 pages.
The State Intellectual Property Office of the People's Republic of China Application Serial No. 201380041245.2, Office Action dated Mar. 14, 2018, 6 pages.
Intellectual Property Office of India Application Serial No. 554/KOLNP/2015, Office Action dated Aug. 9, 2018, 7 pages.

\* cited by examiner

METHOD FOR REPORTING MOBILITY INFORMATION IN WIRELESS COMMUNICATION SYSTEM AND APPARATUS FOR SUPPORTING SAME

CROSS-REFERENCE TO RELATED APPLICATIONS

This application a continuation of U.S. application Ser. No. 14/414,694, filed on Jan. 13, 2015, now U.S. Pat. No. 9,344,937, which is the National Stage filing under 35 U.S.C. 371 of International Application No. PCT/KR2013/007094, filed on Aug. 6, 2013, which claims the benefit of U.S. Provisional Application No. 61/679,797, filed on Aug. 6, 2012, the contents of which are all hereby incorporated by reference herein in their entirety.

BACKGROUND OF THE INVENTION

Field of the Invention

The present invention relates to wireless communications, and more particularly, to a method of reporting mobility information of a user equipment in a wireless communication system, and an apparatus supporting the method.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

A micro cell, a femto cell, and a pico cell, etc., having a small service coverage may be installed in a specific location within a coverage of a macro cell having a wide coverage. Such a cell may be called a small cell.

Since a user equipment (UE) which is a representative mobile device moves, quality of a currently provided service may deteriorate or a cell capable of providing a better service may be detected. Accordingly, the UE may move to a new cell, which is called performing a movement of the UE.

Each cell has a fixed service coverage, and the UE moves on a wireless communication system at a variable speed. Therefore, how often the UE moves from one cell to another may change occasionally. In order to support a proper inter-cell movement of the UE by considering an actual movement situation of the UE, a method of a mobility state estimation (MSE) and of scaling a mobility parameter has been supported.

With the deployment of cells having various sizes in a wireless communication system, an area in which a network can utilize information regarding a mobility of the UE becomes much wider. For this, it is requested to provide a method in which the UE reports the mobility information to the network.

SUMMARY OF THE INVENTION

The present invention provides a method of reporting mobility information in a wireless communication system, and an apparatus for supporting the method.

In an aspect of the present invention, a method for mobility information reporting performed by a terminal in a wireless communication system is provided. The method comprises generating mobility information; and reporting the mobility information to a network. The mobility information comprises mobility state information indicating an estimated mobility state of the terminal and mobility history information related to a history of performing a movement of the terminal.

The generating of the mobility information may comprise estimating the mobility state and collecting at least one mobility history entry, wherein the mobility history information comprises the at least one mobility history entry.

Each of the mobility history entries may be collected when the terminal performs the movement through a cell reselection or a handover.

Each of the mobility history entries may comprise a cell identity for each serving cell, a time during which the terminal stays in each of the serving cells and a time at which the terminal moves to each of the serving cells.

Each of the mobility history entries may further comprise the number of serving cells experienced by the terminal during a previous specific time period from a time at which the terminal moves to each of the serving cells.

Each of the serving cells may be a new serving cell on the basis of the movement performed by the terminal.

Each of the serving cells may be a previous serving cell on the basis of the movement performed by the terminal.

Each of the mobility history entries may be collected when a mobility information generation is allowed for each of the serving cells.

Each mobility history entry may be discarded when a specific time period elapses from a collection time.

The maximum number of the reported at least one mobility history entry may be a positive integer N.

If the number of collected mobility history entries exceeds N, a first collected mobility history entry may be replaced by a most recently collected mobility history entry.

The method may further comprise discarding the mobility information if the mobility information is reported.

The reporting of the mobility information may comprise transmitting a mobility information availability indicator for indicating a presence of mobility information to be reported by the terminal and upon receiving a mobility information reporting request from the network in response to the mobility information availability indicator, transmitting the mobility information to the network.

The mobility information availability indicator may be transmitted during a process in which the terminal configures a radio resource control (RRC) connection with the network.

The mobility information may be reported to the network during a process in which the terminal configures an RRC connection with the network.

In another aspect of the present invention, a terminal operating in a wireless communication system is provided. The terminal comprises a radio frequency (RF) unit for transmitting and receiving a radio signal and a processor operatively coupled to the RF unit. The processor is configured for: generating mobility information; and reporting the mobility information to a network, wherein the mobility information comprises: mobility state information indicating an estimated mobility state of the terminal; and mobility history information related to a history of performing a movement of the terminal.

According to an embodiment of the present invention, a user equipment (UE) collects information related to performing a movement and reports it to a network. Since the UE optionally reports mobility information to the network, the network can more effectively estimate a state related to the movement of the UE. On the basis thereof, the network can provide a configuration related to an operation of the UE, and thus may provide a more improved service to the UE. In addition, a network resource can be more effectively used.

DESCRIPTION OF EXEMPLARY EMBODIMENTS

Figure 1:
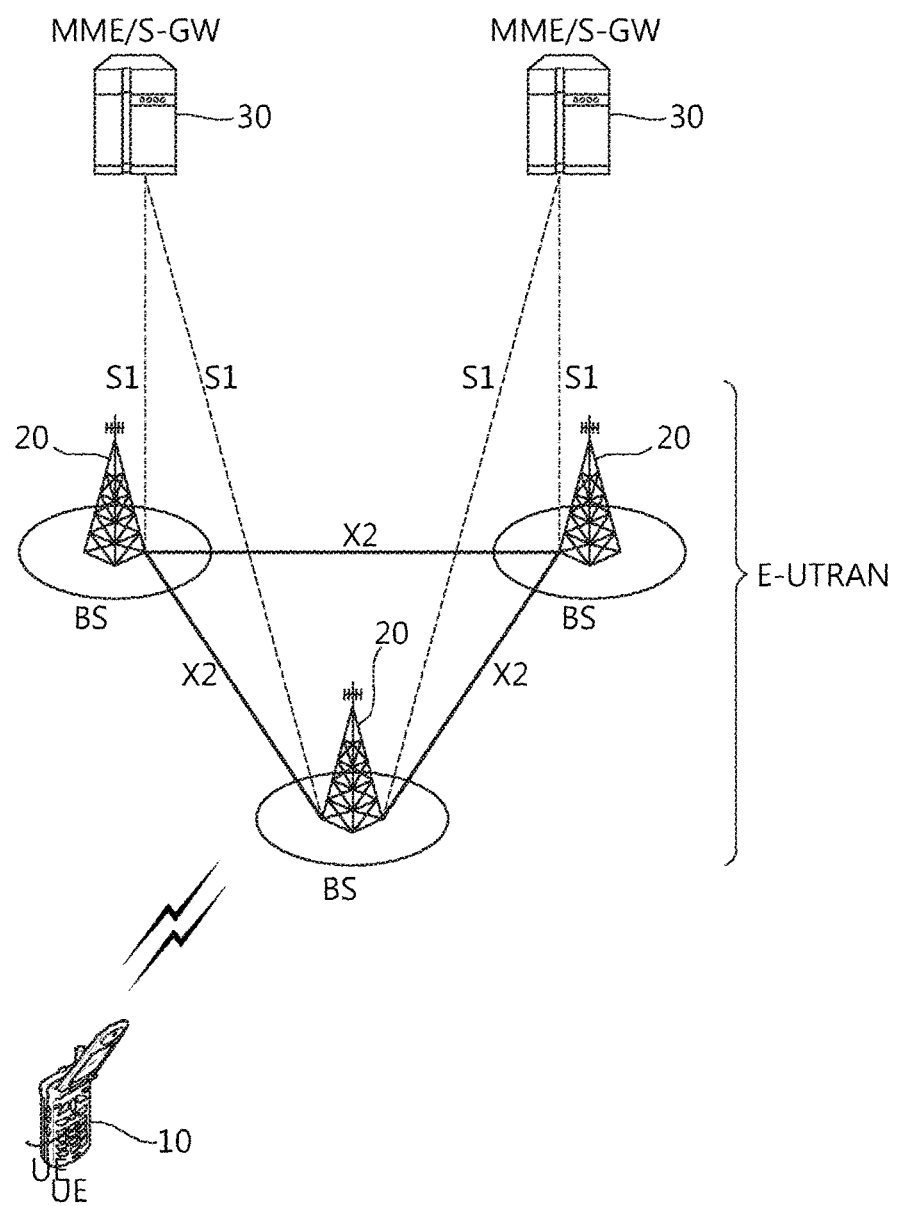
FIG. 1 illustrates a wireless communication system to which the present invention is applied.

FIG. 1 illustrates a wireless communication system to which the present invention is applied. This may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an S1-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. For this, the RRC layer exchanges an RRC message between the UE and the base station.

Figure 2:
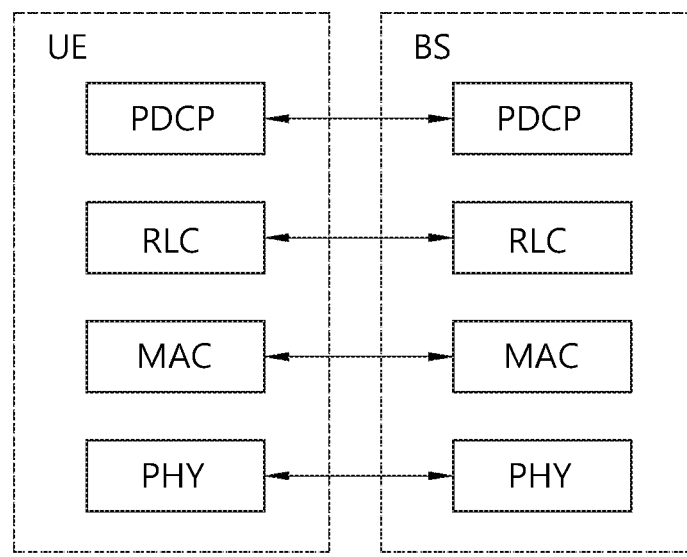
FIG. 2 is a block diagram illustrating a radio protocol architecture for a user plane.
Figure 3:
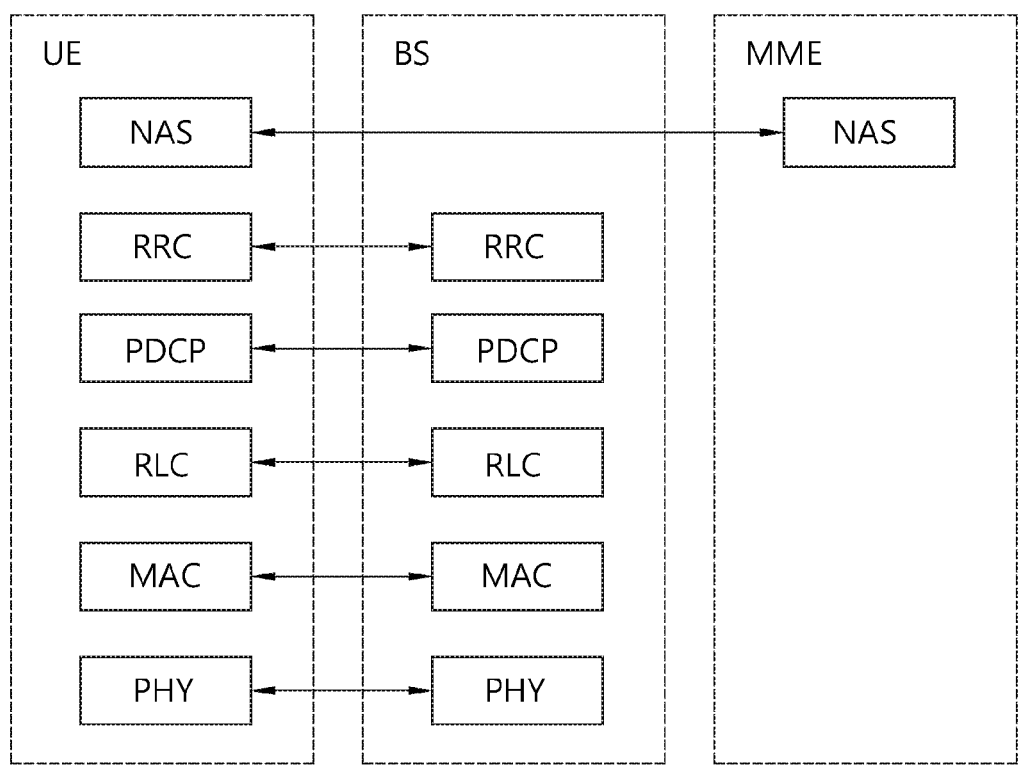
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

A function of a packet data convergence protocol (PDCP) layer on the user plane includes transferring of user data, header compression, and ciphering. A function of a packet data convergence protocol (PDCP) layer on the user plane includes transferring of control plane data and ciphering/integrity protection.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer (NAS) located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-September) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on an uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
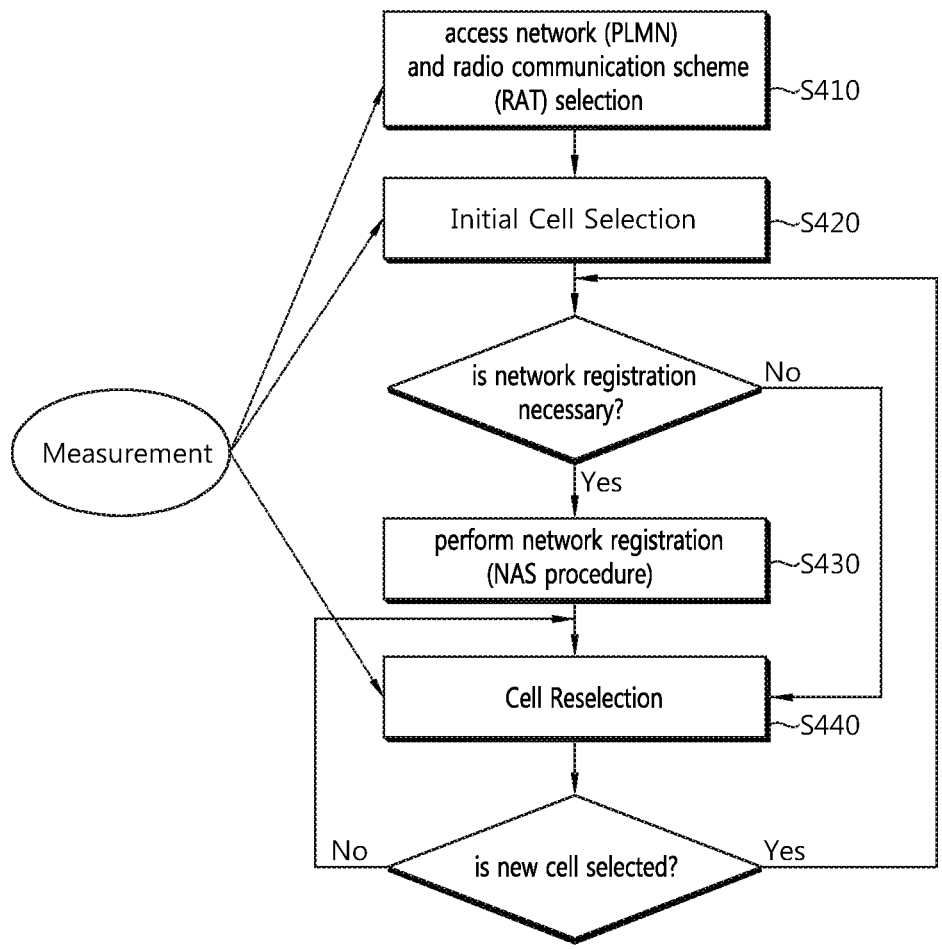
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (step, S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (step, S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (step, S430). The UE registers its own information (e.g., IMSI) in order to receive a service (e.g., paging) from the network. The UE does not register the information in the accessed network whenever selecting the cell, and registers the information when information (e.g., a tracking area identity; TAI) of the network that receives from the system information is different from information on a network known by the UE.

The UE performs the cell reselection based on a service environment provided by the cell or an environment of the UE (step, S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
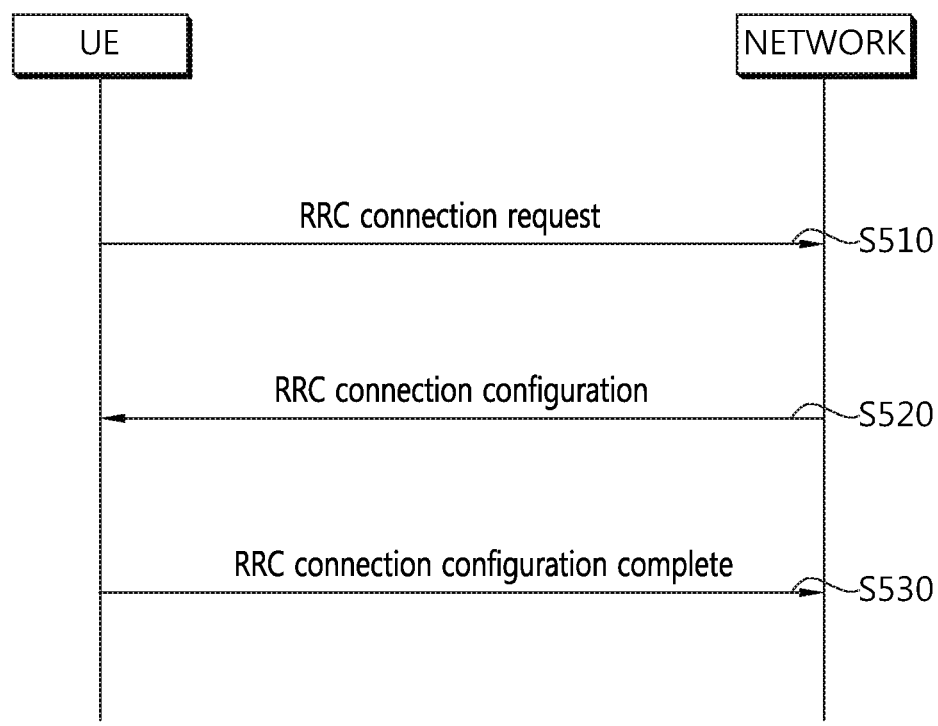
FIG. 5 is a flowchart illustrating a procedure of establishing an RRC connection.

FIG. 5 is a flowchart illustrating a procedure of establishing an RRC connection.

The UE sends to the network an RRC connection request message for requesting the RRC connection (step, S510). The network sends an RRC connection setup message as a response to the RRC connection request (step, S520). The UE enters an RRC connection mode after receiving the RRC connection setup message.

The UE sends to the network an RRC connection setup complete message used to verify successful completion of establishing the RRC connection (step, S530).

Figure 6:
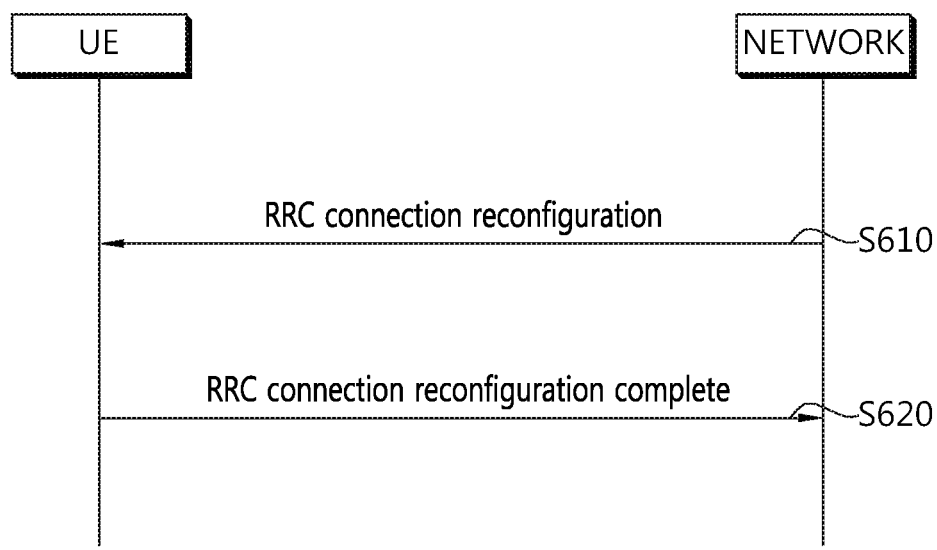
FIG. 6 is a flowchart illustrating a procedure of reconfiguring the RRC connection.

FIG. 6 is a flowchart illustrating a procedure of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (step, S610). The UE sends to the network an RRC connection reconfiguration complete message used to verify successful completion of establishing the RRC connection reconfiguration as a response to the RRC connection reconfiguration (step, S620).

Hereinafter, the public land mobile network (PLMN) will be described.

The PLMN is a network that is deployed and operated by mobile network operators. Each mobile network operator operates one or more PLMN. Each PLMN may be distinguished by Mobile Country Code (MCC) and Mobile Network Code (MNC). The PLMN information of cells is included in the system information and broadcasted.

For selecting PLMN, cells and reselecting cells, various types of PLMNs may be considered by a UE.

HPLMN (Home PLMN): The PLMN having MCC and MNC which are respectively matched to MCC and MNC of a UE IMSI.

EHPLMN (Equivalent HPLMN): The PLMN handled to be equivalent to the HPLMN.

RPLMN (Registered PLMN): The PLMN of which the location is successfully registered.

EPLMN (Equivalent PLMN): The PLMN handled to be equivalent to the RPLMN.

Each consumer of the mobile service subscribes to the HPLMN. When the general service is provided for a UE through the HPLMN or the EHPLMN, the UE is not in the roaming state. On the other hand, a service is provided for a UE through the PLMN except the HPLMN/EHPLMN, the UE is in the roaming state, and the PLMN is called Visited PLMN (VPLMN).

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. Each of the PLMNs may be identified by a mobile country code (MCC) and a mobile network code (MNC). The PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service. However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

Next, the procedure of a UE selecting a cell will be described in detail.

When power is turned on or being remained in a cell, the UE performs the procedures to be serviced by selecting/reselecting a cell of adequate quality.

The UE in the RRC idle state should select the cell of adequate quality always and be ready for being serviced through the cell. For example, the UE which is just turned on should select a cell of adequate quality in order to register a network. When the UE in the RRC connection state enters the RRC idle state, the UE should select the cell which is going to remain in the RRC idle state. As such, the procedure of selecting a cell satisfying a certain condition in order for the UE to remain in the service standby state such as the RRC idle state is called the Cell Selection. It is an important point to select the cell as quick as possible, since the cell selection is performed in the state that the cell where the UE remains in the RRC idle state is not yet determined. Accordingly, if the cell provides a high level of wireless signal quality, the cell can be selected in the procedure of cell selection although the cell is not a cell that provides the best wireless signal quality.

Now, with reference to 3GPP TS 36.304 V8.5.0 (2009-March) "User Equipment (UE) procedures in idle mode (Release 8)", the method and procedure that a UE select a cell in 3GPP LTE will be described.

The cell selection process is generally divided into two ways.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select other cell that provides higher quality. When the cell is again selected as such, a cell that provides higher signal quality than the currently selected cell is generally selected. The process is referred to as the cell reselection. The cell reselection process generally has a basic object to select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselects a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which UEs in cell will commonly apply through broadcast signaling or provide a frequency-dedicated priority for each UE through UE-dedicated signaling. The cell reselection priority provided through the broadcast signaling may be called the common priority, and the cell reselection priority setup by the network for each UE may be called the dedicated priority. When the UE receives the dedicated priority, the UE may receive the relevant validity time together with the dedicated priority. When the UE receives the dedicated priority, the UE starts the validity timer which is setup as the relevant validity time. The UE applies the dedicated priority in the RRC idle mode while the validity timer is operating. If the validity timer is terminated, the UE discards the dedicated priority and applies the common priority again.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used for giving the priority of the cell is defined as illustrated in Equation 1.

$$R_s = Q_{meas,s} + Q_{hyst}, \quad R_n = Q_{meas,n} - Q_{offset} \quad \text{[Equation 1]}$$

Herein, $R_s$ represents a ranking criterion of the serving cell, $R_n$ represents a ranking criterion of the neighboring cell, $Q_{meas,s}$ represents a quality value which the UE measures for the serving cell, $Q_{meas,n}$ represents a quality value which the UE measures for a neighboring cell $Q_{hyst}$ represents a hysteresis value for the ranking, and $Q_{offset}$ represents an offset between two cells.

In an intra-frequency, when the UE receives an offset $Q_{offsets,n}$ between the serving cell and the neighboring cell $Q_{offoset} = Q_{offsets,n}$ and when the UE does not receive $Q_{offsets,n}$, $Q_{offset} = 0$.

In an inter-frequency, when the UE receives the offset $Q_{offsets,n}$ for the corresponding cell, $Q_{offset} = Q_{offsets,n} + Q_{frequency}$ and when the UE does not receive $Q_{offsets,n}$, $Q_{offset} = Q_{frequency}$.

When the ranking varies while the ranking criterion Rs of the serving cell and the ranking criterion of the neighboring cell $R_n$ are similar to each other, the ranking is frequently reversed, and as a result, the UE may alternatively reselect both cells. $Q_{hyst}$ represents a parameter for preventing the UE from alternatively reselecting both cells by giving hysteresis in cell reselection.

The UE measures the $R_s$ of the serving cell and the $R_n$ of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, a radio link monitoring (RLM) will be described.

A UE monitors DL quality based on the cell-specific reference signal in order to detect the DL wireless link quality of the PCell. The UE estimates DL wireless link quality for monitoring the DL wireless link quality of the PCell and compares it with the threshold values Qout and Qin. The threshold value Qout is defined with the level in which the DL wireless link cannot be stably received, and it corresponds to 10% block error rate of hypothetical PDCCH transmission considering the PDFICH error rate. The threshold value Qin is defined with the level in which the DL wireless link can be stably received, better than the level of the Qout, and it corresponds to 2% block error rate of hypothetical PDCCH transmission considering the PCFICH error rate.

Hereinafter, a radio link failure (RLF) will be described.

The UE performs continuously performs measurement for the quality of a radio link with the serving cell that receives the service. The UE decides whether communication is impossible under a current situation due to deterioration in quality of the radio link with the serving cell. When the communication is almost impossible due to too low quality of the serving cell, the UE decides the current situation as a wireless connection failure.

When a radio link failure is decided, the UE abandons maintaining communication with a current serving cell, selects a new cell through the cell selection (alternatively, cell reselection) procedure, and attempts RRC connection re-establishment to a new cell.

In the specification of 3GPP LTE, the cases which are not able to do the normal communication are exemplified as follows.

The case that the UE determines that there is a serious problem in the downlink communication link quality based on the radio quality measurement result of the physical layer of the UE (The case of determining that the quality of the PCell is low during performing the RLM).

The case that the UE determines that there is a problem in the uplink transmission since the random access process continuously fails on the MAC sub layer.

The case that the UE determines that there is a problem in the uplink transmission since the uplink data transmission continuously fails on the RLC sub layer.

The case that the UE determines that the handover fails.

The case that the message received by the UE does not pass the integrity check.

Hereinafter, the process of the RRC connection re-establishment will be described in more detail.

Figure 7:
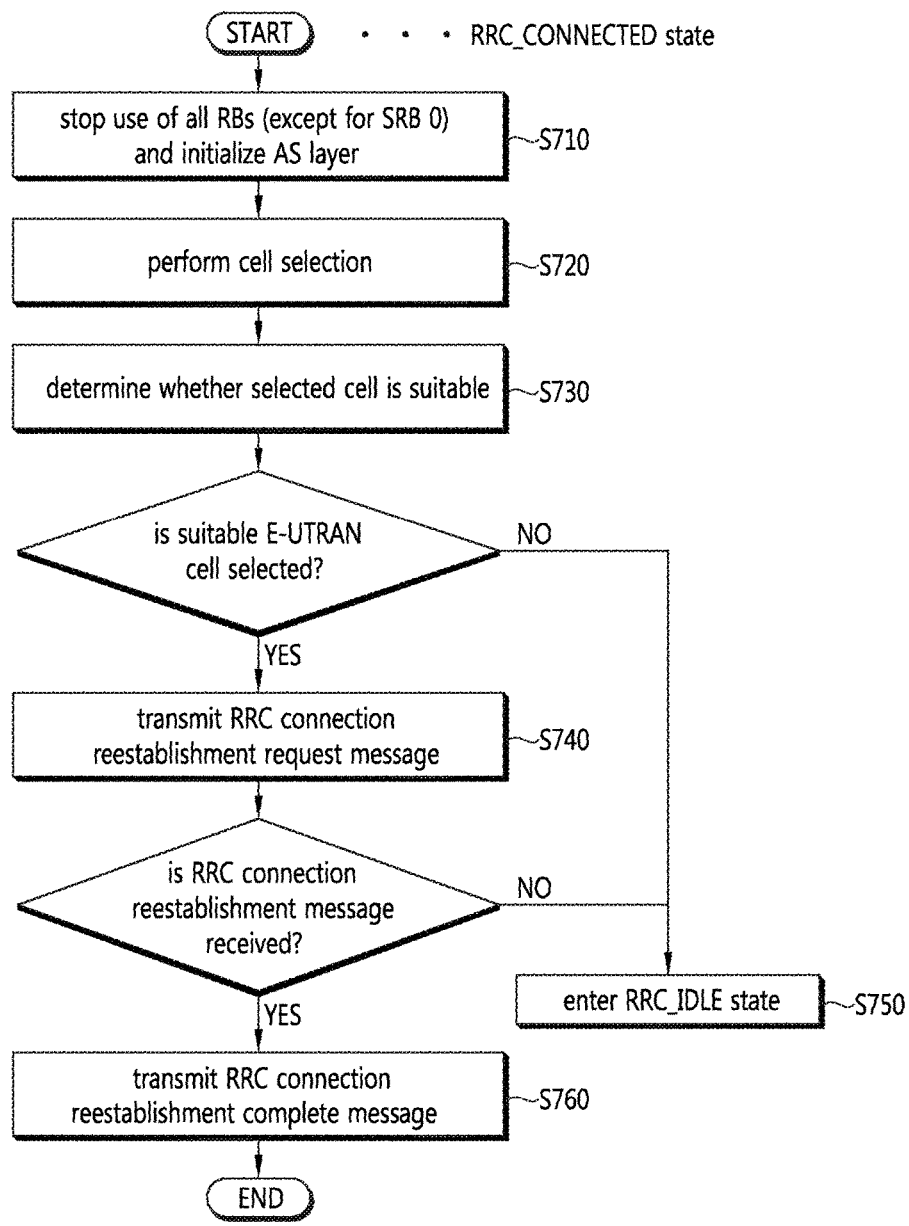
FIG. 7 is a drawing illustrating the procedure of the RRC connection re-establishment.

FIG. 7 is a drawing illustrating the procedure of the RRC connection re-establishment.

Referring to FIG. 7, the UE interrupts the use of all radio bearers which was configured except for the Signaling Radio Bearer #0, and initializes all sorts of sub layers of access stratum (AS). In addition, each sub layer and physical layer is configured as default configuration. During this process, the UE maintains the RRC connection state.

The UE performs the cell selection process for performing the RRC connection re-establishment process (step, S720). Although the UE maintains the RRC connection state, the cell selection process may be performed identically to the cell selection process that the UE performs in the RRC idle state.

The UE determines whether the corresponding cell is proper by verifying the system information of the corresponding cell after performing the cell selection process (step, S730). If it is determined that the selected cell is a proper E-UTRAN cell, the UE transmits the RRC connection re-establishment message to the corresponding cell (step, S740).

Meanwhile, if the cell selected through the cell selection process for performing the RRC connection re-establishment process is determined to be the cell that uses different RAT except the E-UTRAN, the RRC connection re-establishment process is interrupted, and the UE enters the RRC idle state (step, S750).

The UE may be implemented to complete the verification of the suitability of the cell within a limited time through the cell selection process and receiving the system information of the selected cell. For this, the UE may drive a timer in accordance with the start of the RRC connection re-establishment process. The timer may be interrupted if it is determined that the UE selects a proper cell. When the timer is terminated, the UE may enter the RRC idle state by regarding the RRC connection re-establishment as failed. The timer will be referred to as the radio link failure timer below. In the LTE specification TS 36.331, the timer whose name is T311 may be utilized as the radio link failure timer. The UE may acquire the setting value of the timer from the system information of the serving cell.

When receiving the RRC connection re-establishment request message from the UE and accepting the request, the cell transmits the RRC connection re-establishment message to the UE.

The UE that receives the RRC connection re-establishment message from the cell reconfigures the PDCP sub layer for SRB1 and the RLC sub layer. In addition, the UE recalculates all sorts of key values related to the security setting and reconfigures the PDCP sub layer that is in charge of the security as newly calculated security key values. Through this, SRB1 is open between the UE and the cell and the RRC control message may be exchanged. The UE completes the start of SRB1, and transmits the RRC connection re-establishment complete message which is that the RRC connection re-establishment process is completed to the cell (S760).

Meanwhile, if the cell receives the RRC connection re-establishment request message and does not accept the request, the cell transmits a RRC connection reestablishment reject message to the UE.

When the RRC connection re-establishment process is successfully performed, the cell and the UE perform the RRC connection reconfiguration process. Through this, the UE recovers the state prior to performing the RRC connection re-establishment process, and guarantees the continuity of the service as much as possible.

Next, the description related to RLF reporting will be followed.

In order to support the mobility robustness optimization (MRO) of network, when the RLF occurs or the handover failure occurs, the UE reports such failure event to the network.

After the RRC connection re-established, the UE may provide the RLF report to the eNB. The radio measurement included in the RLF report may be used for identifying the coverage problems as a potential reason of failure. The information may exclude such events in the MRO evaluation for the intra-LTE mobility connection failure, and may use the events for the input of other algorithms.

When the RRC connection re-establishment is failed or the UE is unable to perform the RRC connection re-establishment, the UE reconnects in the idle mode, and then may generate the effective RLF report for the eNB. For this purpose, the UE may save the latest RLF or the information related to the handover failure, and may indicate the LTE cell that the RLF report is valid at every RRC connection (re)establishment and the handover until the RLF report is loaded by the network or for 48 hours after the RLF or handover failure is detected.

The UE maintains the information for the state shift and change of the RAT, and indicates again that the RLF report is valid after going back to the LTE RAT.

The validity of the RLF report in the RRC connection configuration procedure is that the UE undergoes the disturbance such as a connection failure and indicates that the RLF report hasn't been yet transferred to the network due to the failure. The RLF report from the UE includes the following information.

The last cell that has provided service to the UE (in case of the RLF) or the E-CGI of the target of handover. If the E-CGI is not known, the PCI and the frequency information are used instead of it.

The E-CGI of the cell that tried the re-establishment.

The E-CGI of the cell that provides service to the UE when the last handover is initialized, for example, when the message 7 (the RRC connection reconfiguration) is received by the UE.

The time lapsed from the last handover initialization to the connection failure.

The information indicating whether the connection failure is due to the RLF or the handover failure.

The radio measurements.

The location of failure.

The eNB that receives the RLF failure from the UE may forward the report to the eNB that has provided service to the UE before the connection failure reported. The radio measurements included in the RLF report may be used for identifying the coverage issues which are the potential causes of the radio link failure. The information may exclude the events from the MRO evaluation of the intra-LTE mobility connection failure and may be used to resend them as the input for other algorithm.

Hereinafter, a measurement and a measurement report are described.

It is necessary for a mobile communication system to support a mobility of a UE. Therefore, the UE persistently measures quality of a serving cell providing a current service and quality of a neighbor cell. The UE reports a measurement result to a network at a proper time. The network provides an optimal mobility to the UE by using a handover or the like. A measurement for such a purpose is often referred to as a radio resource management (RRM) measurement.

To provide information which can be helpful for a network operation of a vender in addition to the purpose of supporting the mobility, the UE may perform a measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information of the specific cell (e.g., a tracking area code), and/or other cell information (e.g., whether it is a member of a closed subscriber group (CSG) cell).

If a UE in motion determines that quality of a specific area is significantly bad, the UE may report a measurement result and location information on cells having bad quality to the network. The network may attempt to optimize the network on the basis of the measurement result reported from UEs which assist the network operation.

In a mobile communication system having a frequency reuse factor of 1, a mobility is generally supported between different cells existing in the same frequency band. Therefore, in order to properly guarantee the mobility of the mobility of the UE, the UE has to properly measure cell information and quality of neighbor cells having the same center frequency as a center frequency of a serving cell. A measurement on a cell having the same center frequency as the center frequency of the serving cell is referred to as an intra-frequency measurement. The UE performs the intra-frequency measurement and reports a measurement result to the network, so as to achieve the purpose of the measurement result.

A mobile communication vendor may operate a network by using a plurality of frequency bands. If a service of a communication system is provided by using the plurality of frequency bands, an optimal mobility can be guaranteed to the UE when the UE is able to properly measure cell information and quality of neighbor cells having a different center frequency from the center frequency of the serving cell. A measurement on a cell having the different center frequency from the center frequency of the serving cell is referred to as an inter-frequency measurement. The UE has to be able to perform the inter-frequency measurement and report a measurement result to the network.

When the UE supports a measurement on a network based on a different RAT, a measurement on a cell of the network may be performed according to a configuration of a BS. Such a measurement is referred to as an inter-radio access technology (RAT) measurement. For example, the RAT may include a GMS EDGE radio access network (GERAN) and a UMTS terrestrial radio access network (UTRAN) conforming to the 3GPP standard, and may also include a CDMA 2000 system conforming to the 3GPP2 standard.

Figure 8:
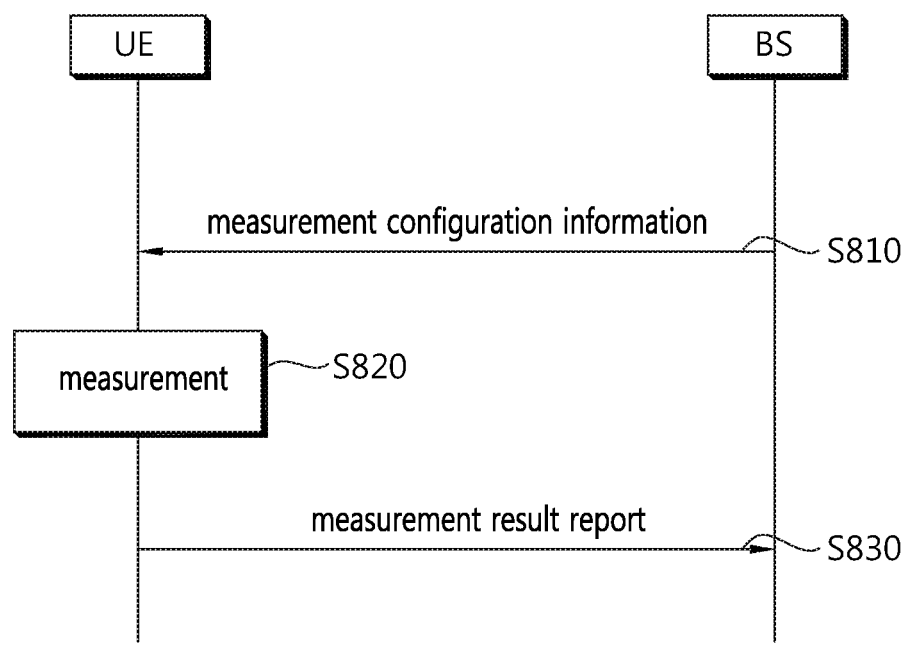
FIG. 8 is a flowchart showing the conventional method of performing a measurement.

FIG. 8 is a flowchart showing the conventional method of performing a measurement.

A UE receives measurement configuration information from a BS (step S810). A message including the measurement configuration information is referred to as a measurement configuration message. The UE performs the measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object information: This information is in regards to an object for which a measurement is performed by the UE. The measurement object includes at least one of an intra-frequency measurement object which is an object of an intra-frequency measurement, an inter-frequency measurement object which is an object of an inter-frequency measurement, and an inter-RAT measurement object which is an object of an inter-RAT measurement. For example, the intra-frequency measurement object may indicate a neighbor cell having the same frequency band as a frequency band of a serving cell, the inter-frequency measurement object may indicate a neighbor cell having a different frequency band from a frequency band of the serving cell, and the inter-RAT measurement object may indicate a neighbor cell having a different RAT from an RAT of the serving cell.

(2) Reporting configuration information: This information is in regards to a report type and a reporting condition regarding when the UE reports a measurement result. The reporting configuration information may be constructed of a list of reporting configurations. Each reporting configuration may include a reporting criterion and a reporting format. The reporting criterion is a criterion which triggers the UE to transmit a measurement result. The reporting criterion may be a period of a measurement report or a single event for the measurement report. The reporting format is information regarding a specific type according to which the UE configures the measurement result.

(3) Measurement identity information: This information is in regards to a measurement identity for determining when and in what type the UE will report a specific measurement object by associating the measurement object with a reporting configuration. The measurement identity information may be included in the measurement report message to indicate a specific measurement object for which the measurement result is obtained and a specific reporting condition according to which the measurement report is generated.

(4) Quantity configuration information: This information is in regards to a measurement unit, a reporting unit, and/or a parameter for configuring filtering of a measurement result value.

(5) Measurement gap information: This information is in regards to a measurement gap as a duration that can be used by the UE only for a measurement without consideration of data transmission with a serving cell when downlink transmission or uplink transmission is not scheduled.

To perform a measurement procedure, the UE has a measurement object list, a measurement reporting configuration list, and a measurement identity list.

In 3GPP LTE, the BS can assign only one measurement object to the UE with respect to one frequency band. Events for triggering a measurement report shown in the table below are defined in the section 5.5.4 of 3GPP TS 36.331 V8.5.0 (2009-March) "Evolved Universal Terrestrial Radio Access (E-UTRA) Radio Resource Control (RRC); Protocol specification (Release 8)".

TABLE 1

| Event | Reporting condition |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the UE satisfies the defined event, the UE transmits a measurement report message to the BS.

Figure 9:
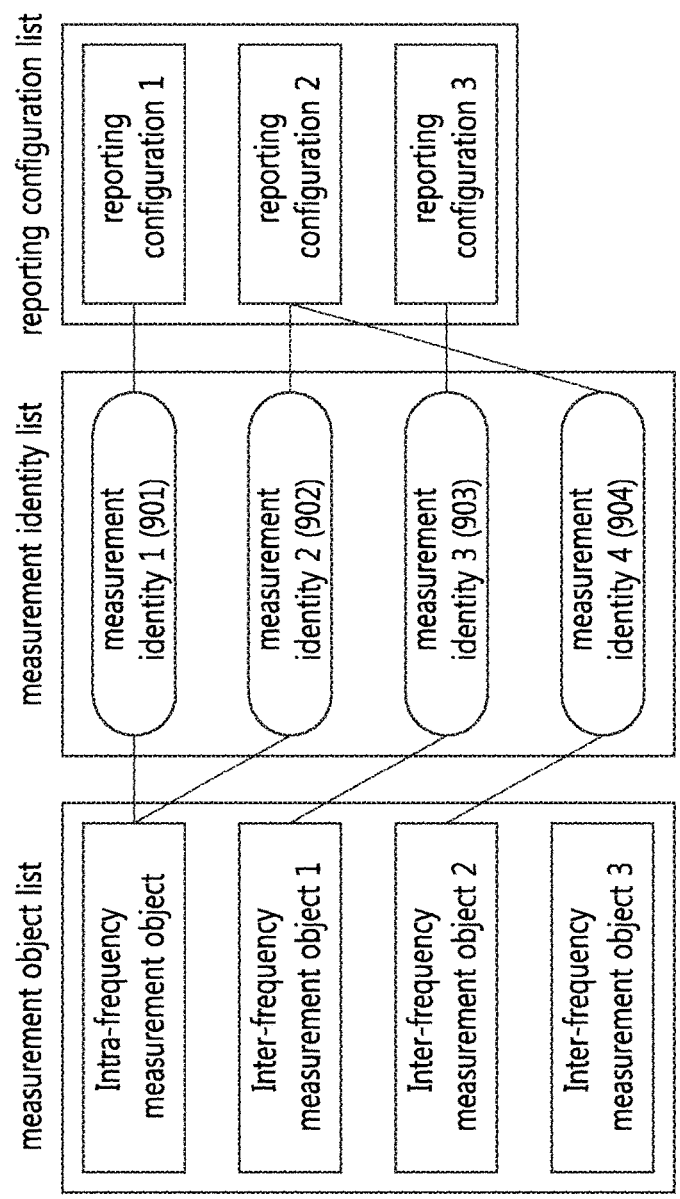
FIG. 9 shows an example of a measurement configuration configured to a user equipment (UE).

FIG. 9 shows an example of a measurement configuration configured to a UE.

First, a measurement identity1 901 associates an intra-frequency measurement object with a reporting configuration 1. The UE performs an intra-frequency measurement. The reporting configuration 1 is used to determine a report type and a criterion for a measurement result report.

Although a measurement identity2 902 is associated with the intra-frequency measurement object similarly to the measurement identity1 901, it associates the intra-frequency measurement object with a reporting configuration 2. The UE performs a measurement. The reporting configuration 2 is used to determine a report type and a criterion for a measurement result report.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting condition included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting condition included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
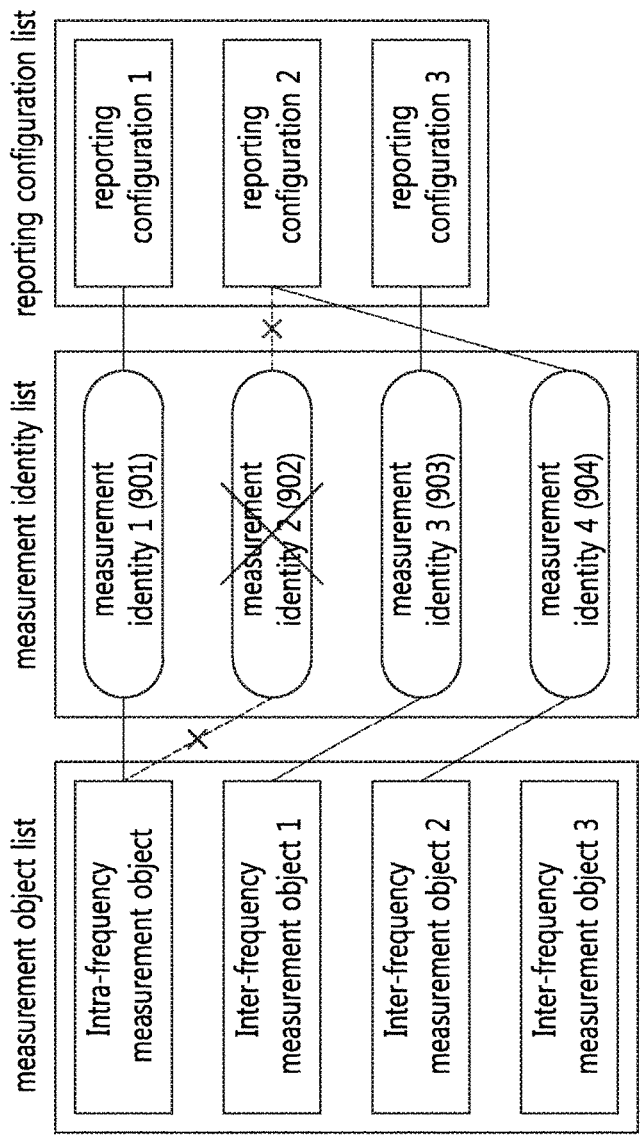
FIG. 10 shows an example of deleting a measurement identity.

FIG. 10 shows an example of deleting a measurement identity. When a measurement identity2 902 is deleted, a measurement on a measurement object associated with the measurement identity2 902 is suspended, and a measurement report is not transmitted. A reporting configuration or a measurement object associated with the deleted measurement identity may not be modified.

Figure 11:
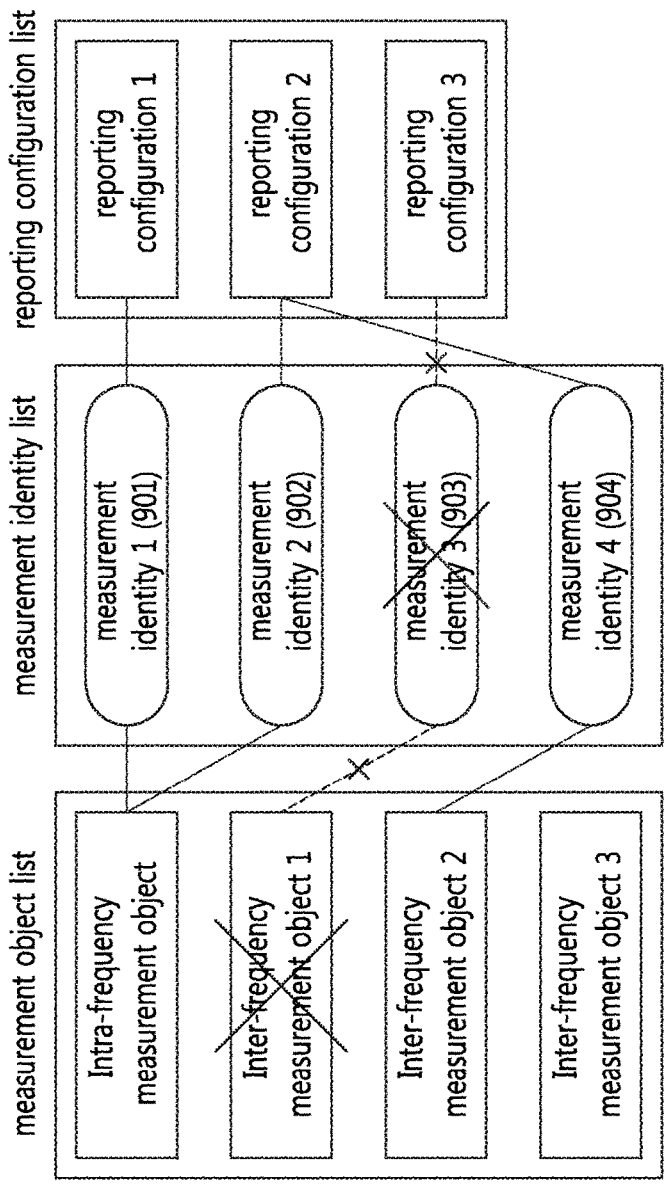
FIG. 11 shows an example of deleting a measurement object.

FIG. 11 shows an example of deleting a measurement object. When an inter-frequency measurement object 1 is deleted, a UE also deletes an associated measurement identity3 903. A measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identity. The UE suspends a measurement on an associated measurement object according to the associated measurement identity. However, a measurement object associated with the deleted reporting configuration may not be modified or deleted.

A measurement report may include a measurement identity, a measured quality of a serving cell, and a measurement result of a neighboring cell. The measurement identity identifies a measurement object for which the measurement report is triggered. The measurement result of the neighboring cell may include a measured quality and a cell identity of the neighboring cell. The measured quality may include at least one of a reference signal received power (RSRP) and a reference signal received quality (RSRQ).

The following description is about scaling of a mobility-related parameter having an effect a determination on whether to perform a movement of the UE according to a UE mobility state. When the UE passes by cells at a fast speed, a movement to neighboring cells may not be achieved at a proper time, and thus a service disabled state may occur. Therefore, the mobility-related parameter can be optimized according to a UE speed to improve the movement of the UE. As such, when the UE determines a mobility state (i.e., performs a mobility state estimation (MSE)), and scales a parameter related to the mobility determination according to the UE mobility state, the movement of the UE can be more effectively supported.

The UE mobility state determined by the MSE may be divided into a high mobility state, a medium mobility state, and a normal mobility state. Each mobility state may be determined on the basis of the number of times of performing a handover by the UE and/or the number of times of performing a cell reselection.

The UE in an RRC_IDLE state performs the cell reselection when a cell reselection condition is satisfied. If the number of times of performing the cell reselection by the UE during a specific time period $T_{CRmax}$ exceeds a first threshold $N_{CR\_H}$, the UE mobility state satisfies a condition of the high mobility state. Meanwhile, if the number of times of performing the cell reselection by the UE during the specific time period $T_{CRmax}$ exceeds a second threshold $N_{CR\_M}$ and does not exceed the first threshold $N_{CR\_H}$, the UE mobility state satisfies a condition of the medium mobility state. If the number of times of performing the cell reselection by the UE during the specific time period $T_{CRmax}$ does not exceed the second threshold $N_{CR\_M}$, the UE mobility state satisfies a condition of the normal mobility state. However, when the UE performs the cell reselection continuously between the two identical cells, it may not be counted as the number of times of performing the cell reselection.

The UE in an RRC_CONNECTED state reports a measurement result and performs a handover if a specific condition is satisfied in a neighboring cell measurement. If the number of times of performing the handover by the UE during a specific time period exceeds the first threshold, the UE mobility state satisfies the condition of the high mobility state. Meanwhile, if the number of times of performing the handover by the UE during the specific time period exceeds a second threshold and does not exceed the first threshold, the UE mobility state satisfies the condition of the medium mobility state. If the number of times of performing the handover by the UE during the specific time period does not exceed the second threshold, the UE mobility state satisfies the condition of the normal mobility state.

The UE in the RRC_IDLE or RRC_CONNECTED state may enter a corresponding mobility state if it is detected that the aforementioned mobility state condition is satisfied. Entering the corresponding mobility state may be a process in which the UE determines that its mobility state is the corresponding mobility state. However, if it is determined that both of the high mobility state condition and the medium mobility state condition are not satisfied during the specific time period, the UE may enter the normal mobility state.

When determining the mobility state, the UE may scale the mobility parameter on the basis of the mobility state. The UE in the RRC_IDLE state may scale a parameter Treselection, and the UE in the RRC_CONNECTED state may scale a parameter TimeToTrigger. The scaling may be implemented by multiplying the parameter Treselection or the parameter TimeToTrigger by a specific scaling factor. The scaling factor may vary depending on the UE mobility state. For example, a scaling factor at the high mobility state may be less than a scaling factor at the medium mobility state. The scaling may not be performed in the normal mobility state. The scaling may be performed not only by the UE but also by the network or the cell, and information thereon may be provided to the UE.

First, scaling applied to the parameter Treselection used for the cell reselection by the UE in the RRC_IDLE state will be described in detail.

1) In Case of the Normal Mobility State (Neither Medium Nor High Mobility State)

Treselection is not scaled.

2) In Case of the High Mobility State

In E-UTRAN, scaling is performed by multiplying Treselection$_{EUTRA}$ by a scaling factor sf-high.

In UTRAN, scaling is performed by multiplying Tsreelection$_{UTRA}$ by the scaling factor sf-high.

In GERAN, scaling is performed by multiplying Treselection$_{GERA}$ by the scaling factor sf-high.

In CDMA2000 HRPD, scaling is performed by multiplying Treselection$_{CDMA\_HRPD}$ by the scaling factor sf-high.

In CDMA2000 1×RTT, scaling is performed by multiplying Treselection$_{CDMA\_1 \times RTT}$ by the scaling factor sf-high.

3) In Case of the Medium Mobility State

In E-UTRAN, scaling is performed by multiplying Treselection$_{EUTRA}$ by a scaling factor sf-medium.

In UTRAN, scaling is performed by multiplying Treselection$_{UTRA}$ by the scaling factor sf-medium.

In GERAN, scaling is performed by multiplying Treselection$_{GERA}$ by the scaling factor sf-medium.

In CDMA2000 HRPD, scaling is performed by multiplying Treselection$_{CDMA\_HRPD}$ by the scaling factor sf-medium.

In CDMA2000 1×RTT, scaling is performed by multiplying Treselection$_{CDMA\_1\times RTT}$ by the scaling factor sf-medium.

An information parameter (e.g., a scaling factor) required for scaling of the parameter Treselection by the UE in the RRC_IDLE state may be provided to the UE by being included in system information to be broadcast. The UE may perform scaling when the system information includes the information parameter for scaling.

Next, scaling applied to the parameter TimeToTrigger used for a measurement report and/or a handover by the UE in the RRC_CONNECTED state will be described in detail.

1) In Case of the Normal Mobility State (Neither Medium Nor High Mobility State)
   TimeToTrigger is not scaled.
2) In Case of the High Mobility State
   Scaling is performed by multiplying TimeToTrigger by a scaling factor sf-high.
3) In Case of the Medium Mobility State
   Scaling is performed by multiplying TimeToTrigger by a scaling factor sf-medium.

As described above, by applying differently scaled mobility parameters according to the UE mobility state, a movement can be performed in a more appropriate manner. For example, if a UE in an RRC_IDLE state moves at a fast speed, whether a condition for performing a cell reselection is satisfied may be determined within a short time period so that the reselection to a target cell is performed rapidly. In addition, if a UE in an RRC_CONNECTED state moves at a fast speed, whether a measurement result reporting condition is satisfied during a specific time period may be determined within a shorter time period and this is reported so that a handover to the target cell is performed more rapidly.

Similarly to the aforementioned mobility state estimated through the MSE, a mobility state of the UE can be implemented in various types. The mobility state of the UE may be expressed by an actual UE speed. In addition, the mobility state of the UE may be expressed by the number of times of performing a UE's cell movement (e.g., a cell reselection and/or a handover) counted for the MSE.

When the network recognizes the mobility state of the UE, it may have a significant effect on a network operation. When cells are deployed on a wireless communication system, small cells such as a pico cell and a femto cell may be arranged within a coverage of a macro cell. In such a situation, if the UE in motion moves to another cell by performing a cell reselection or a handover, the network recognizes the mobility state of the UE, and is operated on the basis of a mobility of the UE according to thereto. In doing so, a more appropriate service can be provided to the UE, and also a network resource can be optimally used.

If the UE stays in the RRC_CONNECTED mode for a long time period, the network may collect information regarding cells which provide services to the UE during a corresponding time period. When the network recognizes a position and/or size of corresponding cells and a time at which the service is provided to the UE in the corresponding cell, a mobility of a UE which receives a service from several cells while staying in the RRC_CONNECTED mode for a long time period may be estimated.

However, immediately after the UE in the RRC_IDLE mode enters the RRC_CONNECTED mode or if the UE frequently performs a state transition to the RRC_IDLE mode and the RRC_CONNECTED mode, the network experiences a difficulty in recognizing information regarding the mobility of the UE. Therefore, it is required a method in which the UE generates its mobility information and reports it to the network.

Figure 12:
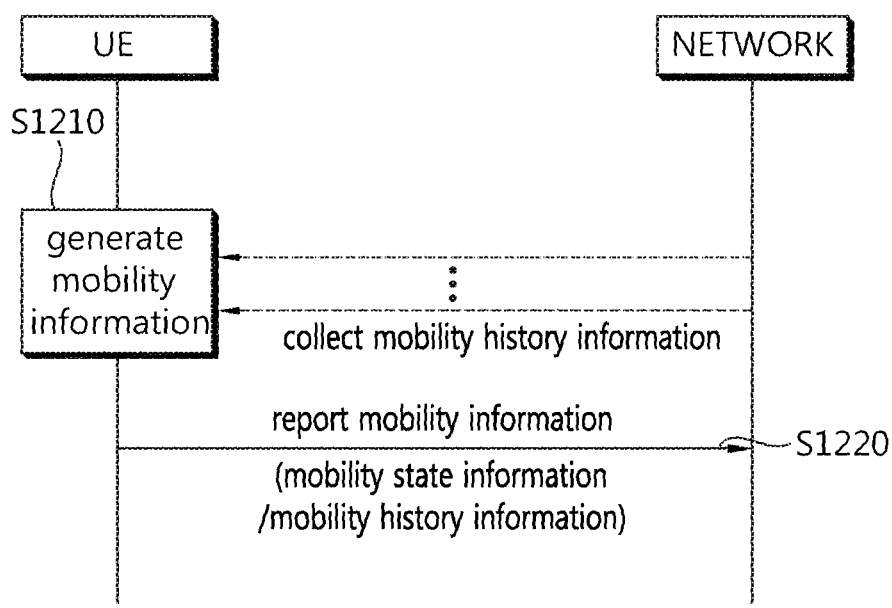
FIG. 12 is a flowchart showing a method of reporting mobility information according to an embodiment of the present invention.

FIG. 12 is a flowchart showing a method of reporting mobility information according to an embodiment of the present invention.

Referring to FIG. 12, a UE generates the mobility information (step S1210).

The mobility information generated by the UE may include at least one of mobility history information and mobility state information.

The UE may collect the mobility history information as a part of the mobility information when performing a movement. The mobility history information includes information related to at least one serving cell on the basis of a mobility of the UE. At least one serving cell may include a current serving cell and/or at least one previous serving cell. The UE may collect information related to each serving cell as a mobility history entry. Therefore, the mobility history information collected by the UE may include at least one mobility history entry for at least one serving cell.

The UE can generate the mobility information only when it is allowed to acquire mobility information for a specific cell. For example, unless specific signalling which indicates that it is not allowed to acquire the mobility information from the specific cell is received, it may be determined that the acquisition of the mobility information is allowed, and the UE may generate the mobility information related to the specific cell. In this case, if there is no signalling related to whether the acquisition of the mobility information from the specific serving cell is allowed, the UE may collect mobility history information for a corresponding cell and/or may update mobility state information based on a movement to the cell.

For another example, unless the signalling which indicates that it is allowed to acquire the mobility information from the specific cell is received, it may be determined that the acquisition of the mobility information is not allowed, and the UE may not generate the mobility information related to the specific cell. In this case, only for a case where signalling related to whether the acquisition of the mobility information from the specific serving cell is allowed is acquired, the UE may collect mobility history information for a corresponding cell and/or may update mobility state information based on a movement to the cell.

Instead of signalling related to whether the acquisition of the mobility information is allowed, signalling related to whether a collection of mobility history information is allowed may be provided from a related cell. The UE may collect the mobility history information according to whether the collection of the mobility history information is allowed. In this case, the update of the mobility state information may be dependent on a UE implementation regardless of whether the update is allowed or not.

Each mobility history entry may include information related to a specific serving cell. The following information may be included in the entry.

1) Cell identity of specific serving cell: It may include at least one of a Physical Cell ID (PCI) of a specific serving cell and/or a GCI (PLMN+cell ID, (Global Cell ID)).

2) A time during which a UE stays in a specific serving cell: When in an RRC_IDLE state, the stay time may be a time in which the UE camps on a suitable cell. Alternatively, when in the RRC_IDLE state, the stay time may be a time during which the UE camps on the suitable cell or an acceptable cell.

3) A time at which the UE moves: It may be information regarding a time at which the UE moves to a specific serving cell through a cell reselection and/or a handover. This may be based on a time stamp. As an example of configuring the time stamp, it may be considered a method of recording a time which elapses from a reference time. The reference time may be a time at which the UE first acquires mobility information.

4) Extra information regarding a specific serving cell: Frequency information, RAT information, PLMN information, etc., may correspond to the extra information.

5) The number of cells experienced by the UE during a specific previous time period from a current time (a time at which a corresponding history entry is collected).

If a plurality of serving cells are configured for the UE (e.g., carrier aggregation), the UE may collect information on a PCell as the mobility history information. The UE may not collect information on an SCell as the mobility history information.

If a mobility anchor cell and a non-mobility anchor cell are configured for the UE, the UE may collect only the mobility anchor cell as the mobility history information. The UE may not collect information on the non-mobility anchor cell as the mobility history information. Such a case may occur when a macro cell and at least one cell are configured to the UE for a dual connectivity, and in this case, the UE collects only information on the macro cell as the mobility history information.

The mobility state information which may be included in mobility information may indicate a current mobility state of the UE. The mobility state information may indicate a mobility state estimated based on the aforementioned MSE. Alternatively, the UE may indicate a measured speed of the UE. The UE may update the mobility state information according to the mobility state estimation or speed measurement.

A method in which the UE generates the mobility information may slightly vary according to a situation. Hereinafter, a method of acquiring the mobility information and managing it will be described in greater detail.

1. Generation of Mobility Information in RRC_CONNECTED State and RRC_IDLE State

The UE may generate the mobility information in the RRC_CONNECTED state and the RRC_IDLE state. In addition, even if the UE in motion is released from the RRC_CONNECTED state or the RRC_IDLE state, the mobility information updated and/or collected in a corresponding state may be maintained instead of discarding it.

The generation of the mobility information related to a specific cell in the RRC_IDLE state or the RRC_CONNECTED state of the UE may be limited to a case where the acquisition of the mobility information is allowed.

The UE may collect the mobility history information according to a movement. The collection of the mobility history information may be performed when the mobility information acquisition regarding a related cell (or the mobility history information collection) is allowed as described above. A collection object of the mobility history information may be a new serving cell or a previous serving cell based on the movement.

The UE may successfully perform the movement, and may collect the mobility history information regarding the previous serving cell. More specifically, if a cell reselection to a new cell is performed in the RRC_IDLE state or if a handover to the new cell is performed in the RRC_CONNECTED state, the UE may acquire mobility history information regarding the previous serving cell.

The UE may successfully perform the movement, and may collect the mobility history information regarding the new serving cell. More specifically, if a cell reselection to a new cell is performed in the RRC_IDLE state or if a handover to the new cell is performed in the RRC_CONNECTED state, the UE may acquire mobility history information regarding the new serving cell.

In addition, when the UE collects the mobility history information, an RAT of a collection object cell may be considered, and whether to collect the mobility history information may be determined on the basis thereof. If the RAT of the collection object cell is not an interesting RAT for the collection, the UE may not collect mobility history information for the cell. For example, the UE may regard LTE as the interesting RAT, and may collect mobility history information for only LTE cells. If the network estimates a mobility state of the UE through mobility information regarding cells of a specific RAT (e.g., LTE), the mobility history information provided by the UE to the network may also be constructed of only a mobility history entry for the cells of the specific RAT (e.g., LTE). Such a method helps to decrease a signalling load of the mobility information reported by the UE to the network.

In a case where the UE collects mobility history information regarding a cell of a specific RAT, if the UE selects another RAT other than the specific RAT, a collection of additional mobility history information may be suspended while maintaining mobility history information stored up to now. Alternatively, if the UE selects another RAT other than the specific RAT, the UE may delete the mobility history information stored up to now, thereby promoting a much simpler implementation of the UE.

Alternatively, when the UE collects the mobility history information, irrespective of an RAT of a cell to which the UE is currently connected, the UE may collect mobility history information regarding the cell. In order to receive a specific service or due to a service coverage shortage of a cell of a current RAT, the UE may be frequently connected to another RAT different from a currently connected RAT. For example, a UE which is connected to an LTE network may be connected to a UMTS network in order to use a circuit switch network when a voice service or a text service is generated. In such a situation, if the UE configures mobility history information by using only information regarding a cell of the LTE network, since a mobility history entry of a cell which can be collected during the UE is connected to another RAT other than LTE is not included, a degree of precision of a UE mobility state which can be estimated by the network through the mobility history information transmitted by the UE may deteriorate. If the network can estimate the mobility of the UE from mobility information acquired from cells based on a plurality of RATs, even if the UE is connected to another RAT, the UE may configure the mobility history information by using information regarding a cell of a corresponding RAT and may report this at a later time, so as to help the network to more precisely estimate the mobility of the UE.

2. Generation of Mobility Information in RRC_IDLE State

The UE may generate mobility information in the RRC_IDLE state. In this case, if the UE enters the RRC_CONNECTED state, the generated mobility information may be maintained without being discarded, or may be discarded.

The generation of the mobility information related to a specific cell in the RRC_IDLE state of the UE may be limited to a case where the acquisition of the mobility information is allowed.

The UE may collect the mobility history information according to a movement. The collection of the mobility history information may be performed when the mobility information acquisition regarding a related cell (or the mobility history information collection) is allowed as described above. A collection object of the mobility history information may be a new serving cell or a previous serving cell based on the movement.

The UE may successfully perform the movement, and may collect the mobility history information regarding the previous serving cell. More specifically, if a cell reselection to a new cell is performed in the RRC_IDLE state, the UE may acquire mobility history information regarding a previous serving cell.

The UE may successfully perform the movement, and may collect the mobility history information regarding the new serving cell. More specifically, if a cell reselection to a new cell is performed in the RRC_IDLE state, the UE may acquire mobility history information regarding the new serving cell.

In addition, when the UE collects the mobility history information, an RAT of a collection object cell may be considered, and whether to collect the mobility history information may be determined on the basis thereof. This may be the same as the aforementioned description for a case where the mobility information is generated in the RRC_CONNECTED or RRC_IDLE state, and a detailed description thereof is omitted.

When the mobility information is generated as in step S1210, the mobility history entry may be continuously accumulated as the UE persistently moves, which may result in a gradual increase in a size of the mobility information. Accordingly, a method for allowing the UE to manage the mobility information may be required.

The UE may manage the mobility information on the basis of an amount of the mobility history information to be stored. That is, the UE may collect the mobility history entry for up to N serving cells and then may insert this to the mobility information. The maximum number N of the mobility history entries that can be included in the mobility history information may be a value determined by the network or predetermined in the UE.

If the UE moves to a new cell in a state where mobility history information regarding N serving cells is already stored in the UE, the UE may replace the oldest mobility history entry with a newly collected mobility history entry.

Alternatively, the UE may suspend storing of a new mobility history entry until a storage space is prepared by an amount capable of adding a new entry. That is, if a specific entry is discarded according to a condition of discarding the mobility history information, a space to which the new entry can be added may be prepared, and the UE may be allowed to add the new entry in such a situation. In this case, whether the space for collecting the mobility history entry is present may be applied as one condition of determining whether the UE is allowed to collect the mobility history entry.

The UE may manage mobility information on the basis of a maximum time of preserving a mobility history entry. That is, the UE may manage a specific mobility history entry for a specific cell according to a maximum time that can be stored in the mobility information. An entry which has been stored by exceeding a maximum time from a collection time may be discarded. As such, the maximum time of preserving the mobility history entry may be used as a condition for discarding the mobility history entry.

Meanwhile, the UE may manage the mobility information on the basis of the maximum number of mobility history entries and a time of preserving the mobility history entry.

Referring back to FIG. 12, the UE reports the generated mobility information to the network (step S1220).

In an RRC_CONNECTED state, the UE may report the mobility information to the network. When the mobility information is reported to a specific serving cell, the UE may consider whether the reporting of the mobility information is allowed. That is, if it is allowed to report the mobility information to the serving cell, the mobility information may be reported.

When determining whether the mobility information reporting is allowed, if specific signalling regarding whether the reporting is allowed is not acquired from the serving cell, the UE may determine that the reporting is allowed. That is, unless specific signalling indicating that reporting of the mobility information is not allowed is received from the serving cell, the UE may determine that the reporting of the mobility information is allowed.

Alternatively, if the specific signalling regarding whether the reporting is allowed is not acquired from the serving cell, the UE may determine that the reporting is not allowed. That is, only when the specific signalling for allowing that the reporting of the mobility information is allowed is received from the serving cell, the UE may determine that the reporting of the mobility information is allowed.

The mobility information reporting of the UE may be performed in association with an RRC connection establishment/re-establishment/re-configuration (handover) procedure between the UE and the network. The UE may report the mobility information during the RRC connection establishment/re-establishment/re-configuration procedure, or may report this in response to a request of the network after the procedure is complete.

In the reporting of the mobility information, the UE may indicate to the network a mobility information availability indicator indicating a presence of mobility information to be reported. Upon receiving the mobility information availability indicator, the network may request the UE to report the mobility information. The UE may report the mobility information to the network in response to the request. The mobility information availability indicator may be transmitted to the network by being included in an RRC connection complete message, an RRC connection re-establishment complete message, or an RRC connection re-configuration complete message. Thereafter, the UE may transmit the mobility information to the network in response to a mobility information reporting request of the network.

In the reporting of the mobility information, the UE may transmit the mobility information to the network without having to transmit the mobility information availability indicator. Since the mobility information includes the mobility history information, a network which is not capable of interpreting it (e.g., a legacy network) may discard the information, and a network capable of interpreting it may understand the mobility history information. The mobility information may be transmitted to the network by being included in the RRC connection complete message, the RRC connection re-establishment complete message, or the RRC connection re-configuration complete message.

A reporting method related to the aforementioned mobility information availability indicator may be usefully applied to the reporting of the mobility history information. Regarding the mobility information, since the mobility history information is greater in size than the mobility state information, it may be problematic if it is transmitted during the RRC connection establishment/re-establishment/re-configuration procedure. Accordingly, it may be implemented in such a manner that the mobility state information and the mobility history information availability indicator are transmitted during the RRC connection establishment/re-establishment/re-configuration procedure, and thereafter the mobility history information is transmitted in response to a request of the network. In this case, the mobility history information availability indicator may indicate a presence of mobility history information to be reported.

A UE which reports the mobility information may process successfully reported mobility information, which may be performed as follows.

1) Discarding of reported mobility information: If the mobility information is reported, the UE may discard the mobility information.

2) Preserving of the reported mobility information: Even if the mobility information is reported, the UE may not discard the mobility information but preserve it. That is, the UE may preserve the mobility information until a condition of discarding the mobility information is satisfied. The mobility information is preserved even if it is reported because there is an advantage in that a loss of the mobility information can be prevented when the UE enters again the RRC_IDLE state after staying in the RRC_CONNECTED state during a short time period.

Meanwhile, there is a need to propose a method for processing mobility information in a case where an RLF occurs when the UE moves while preserving the mobility information. In this case, the UE may discard the stored mobility information at the occurrence of the RLF. The discarding of the mobility information may be performed at a time of starting the RRC connection re-establishment procedure. If the UE successfully performs the RRC re-establishment procedure with a specific cell after the RLF occurrence, the UE may not generate mobility information related to the cell. Consequently, since there is no valid mobility information to be reported even after the RRC connection re-establishment for an RLF recovery, the UE does not report the mobility information.

Unlike this, the UE may maintain the mobility information even if the RLF occurs. If the RRC connection re-establishment procedure starts for the RLF recovery, the UE maintains the stored mobility information. The UE may maintain the mobility information until a condition of discarding the mobility information is satisfied. If the UE successfully performs the RRC re-establishment procedure with a specific cell after the RLF occurrence, the UE may not generate mobility information related to the cell.

According to an embodiment of the present invention, the UE collects information related to performing of a movement and reports it to the network. Since the UE optionally reports mobility information to the network, the network may more effectively estimate a state related to a movement of the UE. Accordingly, the network may provide a configuration related to an operation of the UE, and may provide a more improved service to the UE. In addition, a network resource may be more effectively used.

Figure 13:
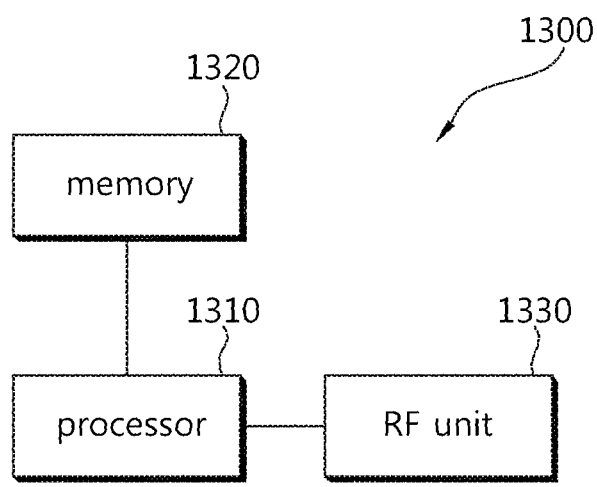
FIG. 13 is a block diagram of a wireless device according to an embodiment of the present invention.

FIG. 13 is a block diagram of a wireless device according to an embodiment of the present invention. This device may implement a UE and/or network for performing a method of reporting mobility information according to an embodiment of the present invention.

A wireless device 1300 includes a processor 1310, a memory 1320, and a radio frequency (RF) unit 1330.

The processor 1310 may be configured to implement the aforementioned embodiment of the present invention with reference to the drawings. The processor 1310 may be configured to acquire mobility information and report it to a network. The processor 1310 may be configured to perform a movement and to collect mobility history information related to a specific serving cell. The processor 1310 may be configured to generate mobility state information according to a mobility group state, and to report it to the network.

The RF unit 1330 is coupled to the processor 1310, and transmits and receives a radio signal.

The processor 1310 and the RF unit 1330 may be implemented to be capable of transmitting/receiving a radio signal according to at least one communication protocol. The RF unit 1330 may include at least one transceiver capable of transmitting and receiving the radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include baseband circuits for processing radio signals. When the embodiment is implemented in software, the aforementioned scheme may be implemented as a module (process or function) that performs the aforementioned function. The module may be stored in the memory and executed by the processor. The memory may be placed inside or outside the processor and may be connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for reporting mobility history information, performed by a user equipment (UE), in a wireless communication system, the method comprising:

generating mobility state estimation (MSE) information and the mobility history information; and transmitting the MSE information together with a mobility information availability indicator to a network, wherein the mobility information availability indicator indicates an existence of the mobility history information to be reported, wherein, when the UE enters to a cell using a first radio access technology (RAT) while the UE was previously out of service and the UE was previously camped on a second RAT, the mobility history information includes entry information indicating a mobility history entry, wherein the entry information includes time information indicating both a first time and a second time, the first time being a time duration that the UE was previously out of service and the second time being a time duration that the UE was previously camped on the second RAT, wherein the MSE information is generated based on a number of cell reselections by the UE, wherein, if the number of cell reselections by the UE during a time period exceeds a first threshold related to a high mobility state, a mobility state of the UE satisfies a condition of the high mobility state, and wherein, if the number of cell reselections by the UE during the time period exceeds a second threshold related to a medium mobility state and does not exceed the first threshold related to the high mobility state, the mobility state of the UE satisfies a condition of the medium mobility state.

2. The method of claim 1, wherein the first RAT and the second RAT are different from each other.

3. The method of claim 1, wherein the entry information includes a global cell identity or a physical cell identity of the second cell.

4. The method of claim 1, wherein the cell is a primary cell or a secondary cell.

5. The method of claim 1, wherein the entry information is included in the mobility history information after removing an oldest entry of the mobility history information.

6. The method of claim 1, wherein the mobility history information is generated in a radio resource control, RRC, connected state and/or in an RRC_idle state of the UE.

7. The method of claim 1, wherein the mobility history information includes a fixed maximum number of entries corresponding to recently caped cells.

8. The method of claim 1, wherein the UE does not update the mobility history information while the UE stays in same RAT.

9. The method of claim 1, wherein the mobility information availability indicator is included in at least a radio resource control (RRC) connection complete message, an RRC connection re-establishment complete message, or an RRC connection re-configuration complete message.

10. A user equipment, UE, for reporting mobility history information in a wireless communication system, the UE comprising:
a radio frequency, RF, unit for transmitting and receiving a radio signal; and
a processor coupled with the RF unit,
wherein the processor is configured to:
generate mobility state estimation (MSE) information and the mobility history information; and
transmit the MSE information together with a mobility information availability indicator to a network,
wherein the mobility information availability indicator indicates an existence of the mobility history information to be reported, wherein, when the UE enters to a cell using a first radio access technology (RAT) while the UE was previously out of service and the UE was previously camped on a second RAT, the mobility history information includes entry information indicating a mobility history entry, wherein the entry information includes time information indicating both a first time and a second time, the first time being a time duration that the UE was previously out of service and the second time being a time duration that the UE was previously camped on the second RAT, wherein the MSE information is generated based on a number of cell reselections by the UE, wherein, if the number of cell reselections by the UE during a time period exceeds a first threshold related to a high mobility state, a mobility state of the UE satisfies a condition of the high mobility state, and wherein, if the number of cell reselections by the UE during the time period exceeds a second threshold related to a medium mobility state and does not exceed the first threshold related to the high mobility state, the mobility state of the UE satisfies a condition of the medium mobility state.

11. The UE of claim 10, wherein the first RAT and the second RAT are different from each other.

12. The UE of claim 10, wherein the entry information includes a global cell identity or a physical cell identity of the second cell.

13. The UE of claim 10, wherein the cell is a primary cell or a secondary cell.

14. The UE of claim 10, wherein the entry information is included in the mobility history information after removing an oldest entry of the mobility history information.

15. The UE of claim 10, wherein the mobility history information is generated in a radio resource control, RRC, connected state and/or in an RRC_idle state of the UE.

16. The UE of claim 10, wherein the mobility history information includes a fixed maximum number of entries corresponding to recently caped cells.

17. The UE of claim 10, wherein the UE does not update the mobility history information while the UE stays in same RAT.

18. The UE of claim 10, wherein the mobility information availability indicator is included in at least a radio resource control (RRC) connection complete message, an RRC connection re-establishment complete message, or an RRC connection re-configuration complete message.

* * * * *